US007461480B1

(12) United States Patent
Gardner

(10) Patent No.: US 7,461,480 B1
(45) Date of Patent: Dec. 9, 2008

(54) SLIDE OUT ROOM SUPPORTED BY FLEXIBLE TENSION MEMBER

(76) Inventor: Stewart E. Gardner, 17812 County Rd. 10, Bristol, IN (US) 46507

( * ) Notice: Subject to any disclaimer, the term of this patent is extended or adjusted under 35 U.S.C. 154(b) by 793 days.

(21) Appl. No.: 10/981,406

(22) Filed: Nov. 4, 2004

Related U.S. Application Data

(60) Provisional application No. 60/518,211, filed on Nov. 7, 2003.

(51) Int. Cl.
*E04B 7/16* (2006.01)
(52) U.S. Cl. .............................. 52/67; 52/79.5; 52/79.6; 52/36.1; 296/26.13
(58) Field of Classification Search .................. 52/79.5, 52/79.1, 67, 36.1, 79.6; 296/165, 26.01, 296/26.09, 26.13, 171, 175
See application file for complete search history.

(56) References Cited

U.S. PATENT DOCUMENTS

| 2,147,892 | A |   | 2/1939  | Gray |            |
|-----------|---|---|---------|------|------------|
| 2,898,144 | A | * | 8/1959  | Ferrera | 296/171 |
| 3,482,716 | A |   | 12/1969 | Leadley |         |
| 3,672,238 | A |   | 6/1972  | Young et al. |    |
| 4,103,462 | A |   | 8/1978  | Freller |         |
| 5,050,927 | A | * | 9/1991  | Montanari | 296/165 |
| 5,090,749 | A | * | 2/1992  | Lee | 296/171 |
| 5,248,180 | A | * | 9/1993  | Hussaini | 296/171 |
| 5,332,276 | A |   | 7/1994  | Blodgett, Jr. |   |
| 6,254,171 | B1 |  | 7/2001  | Young, Sr. |     |
| 6,338,523 | B1 | * | 1/2002 | Rasmussen | 296/175 |
| 6,415,675 | B1 | * | 7/2002 | Schneider et al. | 74/411.5 |
| 6,623,066 | B2 | * | 9/2003 | Garceau et al. | 296/165 |
| 6,644,719 | B2 | * | 11/2003 | Young, Sr. | 296/165 |
| 7,309,092 | B2 | * | 12/2007 | Garceau et al. | 296/26.13 |

* cited by examiner

*Primary Examiner*—Basil Katcheves
(74) *Attorney, Agent, or Firm*—Botkin & Hall, LLP

(57) ABSTRACT

A slide out room is glidingly supported from a main structure by a flexible tension member defining first and second lengths, each length trained about a set of rotatable support members carried by the main structure such that the tension member supports the room from the rotatable support members in both its extended and retracted positions. A tensioner connected to the tension member is used to adjust the tension in the tension member. A leveler carried by the room includes a longitudinal adjustment member that engages the tension member, whereby the room may be leveled relative to the main structure by adjusting the adjustment member.

2 Claims, 5 Drawing Sheets

SLIDE OUT ROOM SUPPORTED BY FLEXIBLE TENSION MEMBER

CROSS-REFERENCE TO RELATED APPLICATION

This is a continuation of and claims priority to provisional application 60/518,211, filed Nov. 7, 2003.

BACKGROUND OF THE INVENTION

1. Field of the Invention

The invention disclosed herein relates to a slide out room for a mobile living quarters such as a recreational vehicle. More specifically, the invention relates to a method of shiftability supporting a slide out room.

2. Discussion of Background Art

In mobile living quarters such as recreational vehicles (RV's), it is desirable to be able to expand the usable living space within the RV. This is often accomplished by having one or more slide out rooms in the RV that shift through an opening in the main wall of the RV between a retracted position within the main body of the RV and an extended position protruding out of the main body. In so doing, two major obstacles that need to be addressed are supporting the slide out room in its extended and retracted positions and smoothly shifting the room between its extended and retracted positions.

One general method of supporting the room includes using tensioned cables carried by one of the slide out room or main body, the cables either supporting or supported by pulleys or sheaves carried by the other of the slide out room or main body. Examples of such pulley and cable systems include U.S. Pat. No. 6,254,171 (Young) and U.S. Pat. No. 4,103,462 (Freller). Although both of these disclosures use cables to support the slide out rooms as they shift between their extended and retracted positions, neither relies solely on the tension support of the cables against their sheaves to support the slide out room in both its extended and retracted positions and all its intermediate positions. For example, in Young, the cables are fixedly secured to the main body with anchors, thereby effectively supporting the room with the cables from the anchors. In order to shift the slide out room, the cables must be driven along an infinite loop defined by a set of sheaves. In Freller, the lower pulley rolls along a support track to help support the back end of the room in its retracted position and as it shifts to its extended position. In order to act as both a pulley and a roller, the cable is sandwiched within a groove between the guide rail and pulley.

It would be desirable to have a room that is supported solely by tensioned cables that are wound about a set of sheaves in order to facilitate smooth and easy shifting of the slide out room by a variety of actuation systems independent of the cable and sheave system.

SUMMARY OF THE INVENTION

The invention disclosed herein includes a slide out room in a main structure having a wall with the slide out room being shiftable through and opening in the wall between an extended position and a retracted position. A tensile member carried by the room is trained about a first pair and a second pair of guide members rotatably carried by the main structure to define a pair of reciprocal opposing paths of the tension members. The tensile member supports the room in its extended position and in its retracted position. The room is shiftable between its retracted and extended positions by the shifting of the tension members about the guide members.

In another aspect of the invention, a parallel motion stabilizer prevents the room from skewing by causing the opposite sides of the room to shift in parallel with each other as the room is shifted relative to the main frame.

In another aspect of the invention, a pair of tension members are trained about first and second pairs of guide members. One tension member supports the room in its extended position, and the other tension member supports the room in its retracted position.

An object of the invention is to provide a cable supported slide out room for use in a mobile living quarters. Another object of the invention is to provide a slide out room in which a minimum of one cable supports the room in both its extended and retracted position.

BRIEF DESCRIPTION OF THE DRAWINGS

These and other aspects of the invention will be apparent from the following description, with reference to the accompanying drawings, in which.

DETAILED DESCRIPTION

Figure 1:
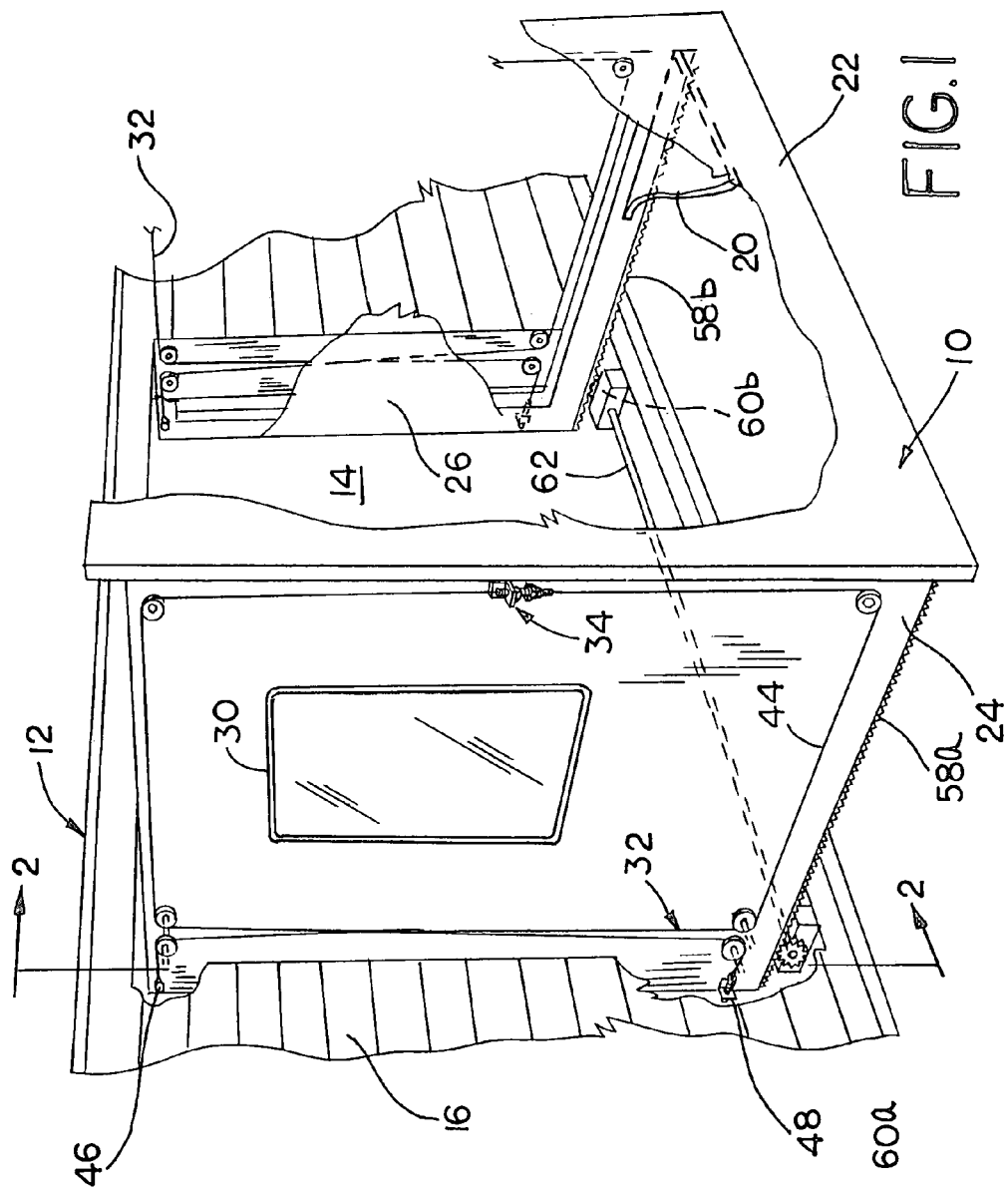
FIG. 1 is an isometric cut away view of a slide out room according to this invention in its extended position.
Figure 2:
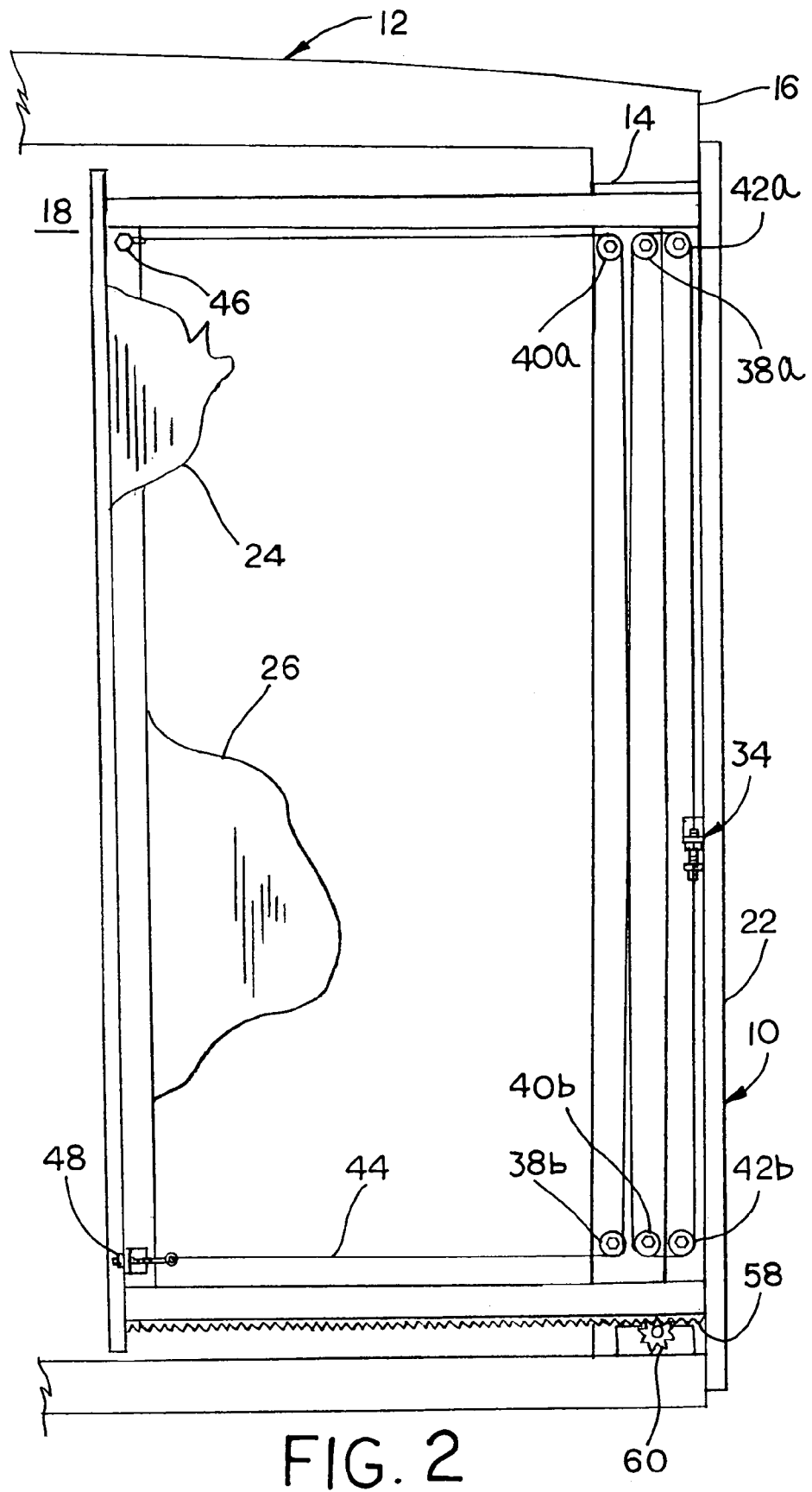
FIG. 2 is a side view of the room in its retracted position shown in fragmented form and as seen along line 2-2 in FIG. 1.
Figure 3:
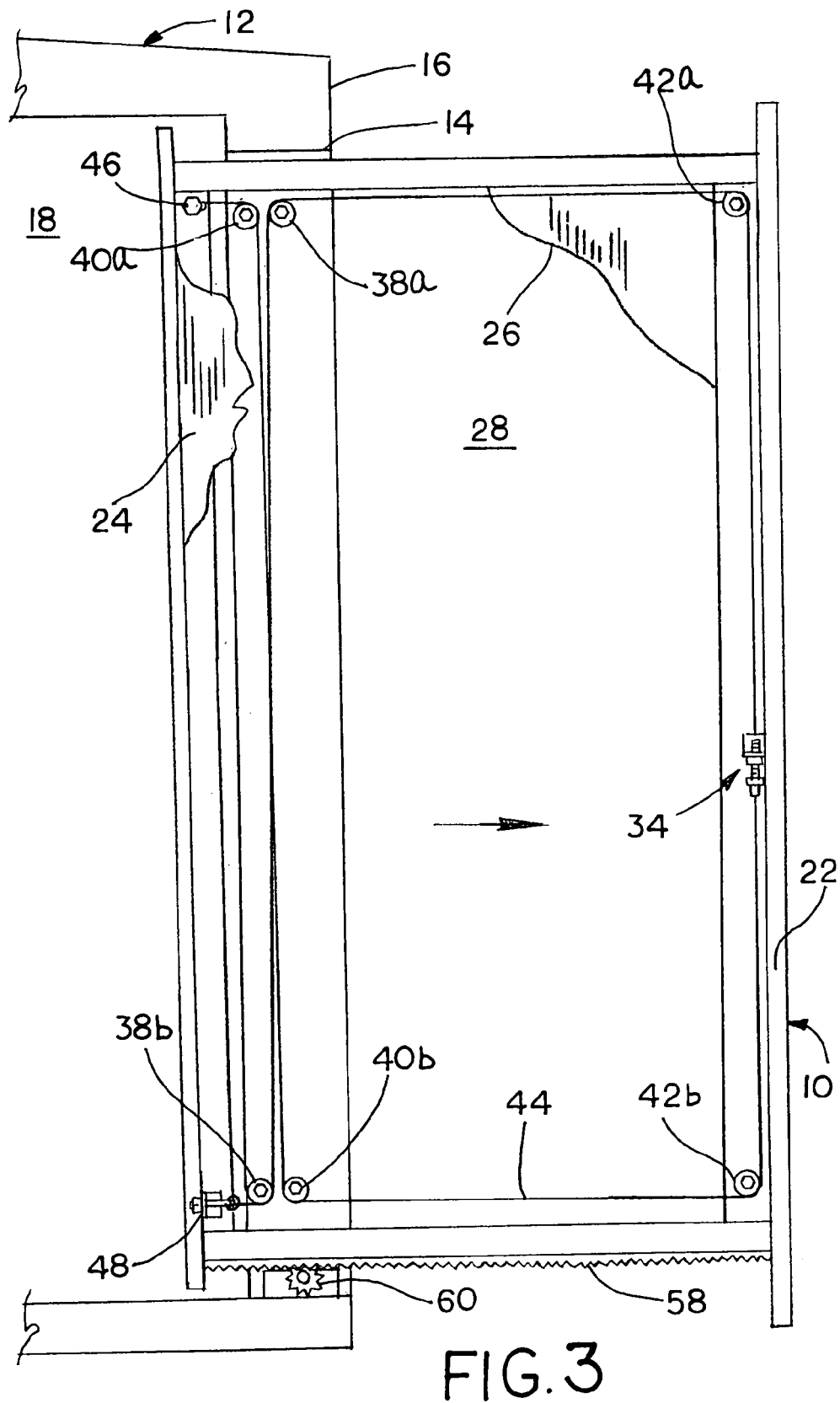
FIG. 3 is a side view of the room as shown in FIG. 2 in its extended position.
Figure 4:
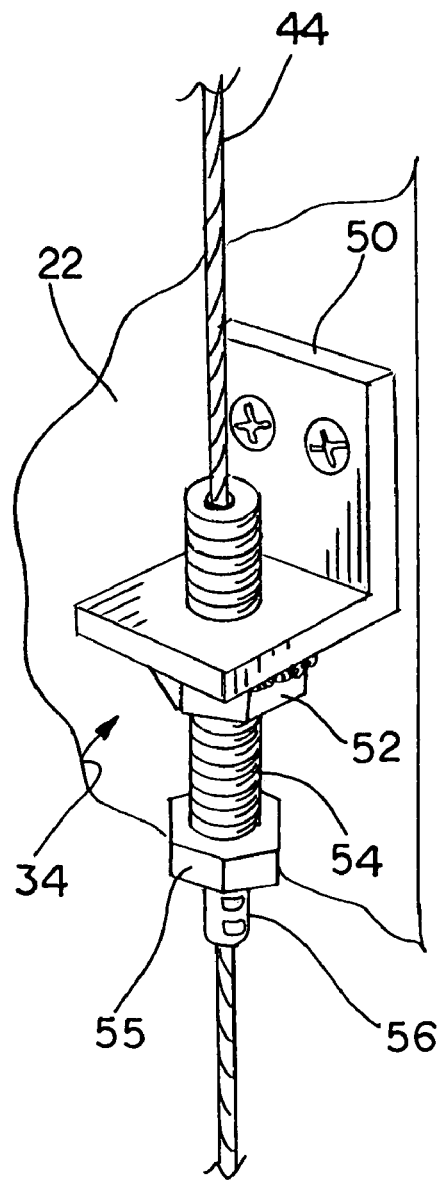
FIG. 4 is an isometric detail of the leveler seen in FIG. 1.
Figure 5:
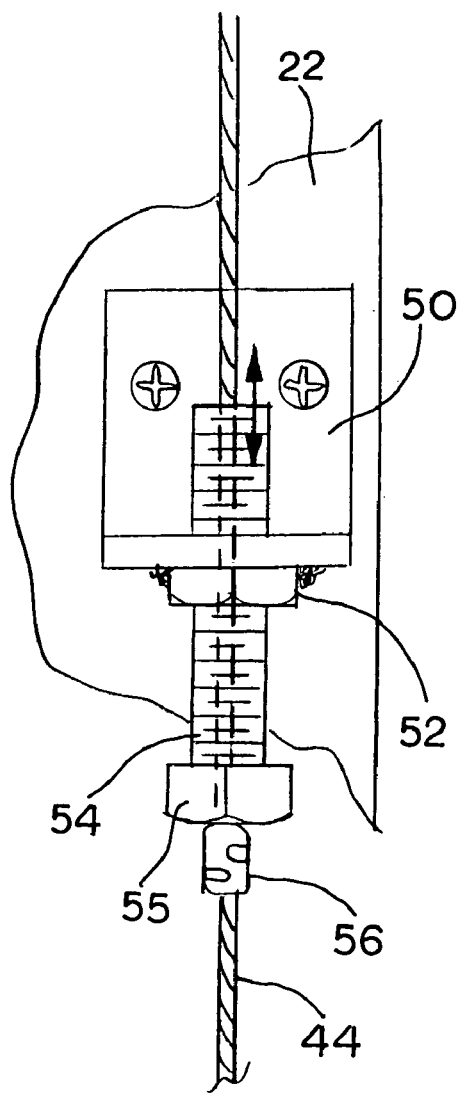
FIG. 5 is a front view of the leveler.

Referring now to the drawings, a slide out room 10 depicted if FIGS. 1 through 3 is carried within a main structure 12 such that it can shift through an opening 14 in wall 16 of structure 12 between a retracted position generally within the interior space 18 of the main structure as seen in FIG. 2 and an extended position projecting out of the main structure through the wall as seen in FIG. 3. Slide out room 10 includes a floor 20, an outer end wall 22, and sidewalls 24 and 26, which collectively define an auxiliary space 28 within the slide out room. A window 30 in sidewall 24 is exposed when the slide out room is in its extended position. Slide out room 10 is glideably supported at each of its sidewalls 24, 26 by a parallel pair of tensioned cable fulcrum support systems, generally indicated by the number 32. A room leveler mechanism 34 associated with each support system is used to adjust the level or angular relationship of room 10 with respect to main structure 12 as explained more fully herein below. A parallel motion stabilizer 60 is used to prevent skewing of room 10 with respect to main structure 12 by causing opposite sides of the room to shift in parallel with each other as the room is shifted between its retracted and extended positions.

Each tensioned cable fulcrum support system 32 includes a first pair of vertically offset sheaves 38a, 38b and a second pair of vertically offset sheaves 40a, 40b attached to and rotatably carried by main structure wall 16 within opening 14 adjacent sidewall 24, 26. A third pair of guide sheaves 42a, 42b are attached to and rotatably carried by sidewall 24, 26. A cable 44 is anchored to the sidewall with a fixed anchor 46 at one end and an adjustable tensioning anchor 48 at the other end of the cable. Tensioning anchor 48 may be any known adjusting device such as, for example, an eye hook threadedly carried by a bracket carried by the side wall. Support sheaves 38a and 40a, guide sheave 42a, and fixed anchor 46 are horizontally aligned along the sidewall near the top of slide out room 10 and parallel to the path of travel of the room between its extended and retracted positions. Support sheaves 38b and 40b, guide sheave 42b, and tensioning anchor 48 are similarly horizontally aligned along the sidewall near the bottom of slide out room 10. Support sheaves 40a and 38b are vertically aligned, support sheaves 38a and 40b are vertically aligned, and guide sheaves 42a, 42b are vertically aligned adjacent to the end wall 22. Cable 44 extends from anchor 46, over sheave 40a, under sheave 40b, around guide sheaves 42b and 42a, over sheave 38a, then under sheave 38b to anchor 48. Each cable 44 is maintained at a desired tension for supporting the room by adjusting tensioning anchor 48.

At proper tension, room 10 may be completely supported solely by the pair of support systems 32 in any position between its extended and retracted position. In its extended position, room 10 is supported generally by the length of cable 44 in tension along the path from sheave 42a, across sheaves 38a and 38b, to anchor 48. In its retracted position, room 10 is supported generally by the length of cable 44 in tension along the path from anchor 46, across sheaves 40a and 40b, to sheave 42b. In this manner, the room may be entirely supported by the pair of tensioned cable fulcrum support systems 32 herein described. Although support sheaves 40a, b and 38a, b are preferably arranged with a maximum of vertical offset as depicted to cause the paths of the cables to crisscross, the tension member fulcrum support system would work with the pairs of sheaves approaching a limit of no vertical offset with the appropriate tension in the cables.

As room 10 is shifted between its extended and retracted positions, sheaves 42a, b move relative to main structure 12 with cable 44 moving across sheaves 38a, b and 40a, b. The portion of the cable between sheaves 42a and 42b does not move with respect to room 10. With each of the sheaves 42a, b and anchors 46, 48 located as near as practical to the outer and inner edges of sidewalls 24, 26, the range of motion of the slide out room 10 between its extended and retracted positions may be maximized.

Room leveler 34 includes a bracket 50 which is carried by end wall 22 and which includes a threaded nut 52 through which a threaded guide bolt 54 is turned. Guide bolt 54 has a hollow center through which cable 44 passes. A cable stop 56 carried by cable 44 abuts guide bolt 54 below the guide bolt. Room 10 may be leveled by adjusting its angular disposition with respect to main structure 12 by moving guide bolt 54 up or down relative to bracket 50 as bolt head 55 is turned. By placing cable stop 56 directly beneath guide bolt 54, the end wall 22 of room 10 is effectively supported by cable 44 in a desired vertical angle orientation, thereby allowing the room to be leveled as the section of cable between sheaves 42a, b is moved relative the room upon turning movement of guide bolt 54. If, with the passage of time, cable 44 stretches beyond the point where room leveler 34 can not effectively adjust the room level, the tension in the entire cable may be increased by shortening the cable with tensioning anchor 48.

Motion stabilizer 36 includes parallel rack gears 58a, 58b carried underneath opposite sides of room 10 below sidewalls 24 and 26. Racks 58a, 58b extend along floor 20 between the tension anchors 48 and guide sheaves 42a, b generally parallel with the path of travel of the room between its extended and retracted positions. Pinion gears 60a, 60b are rotatably carried by main structure 12 in driving engagement with rack gears 58a, 58b and are linked with shaft 62 extending between the pinion gears. Pinion gears 60a, 60b are generally vertically aligned under sheaves 40b on both sides of the room in opening 14. When room 10 is shifted between its extended and retracted positions, racks 58a, 58b engage pinions gears 60a, 60b respectively. Linkage shaft 62 prevents either pinion gear 60a or 60b from rotating at a different speed than the other pinion gear, which thereby equalizes the motion of both racks 58a, 58b. In this manner, the room prevented from skewing with respect to main structure 12. Although pinions 60a, 60b may act as an additional means of support for room 10, they are not necessary for the support of the room. Alternative forms of a side-to-side motion stabilizer that do not also act to support the room could also be used.

To shift rom 10 between its extended and retracted positions, many known driving means could be adapted to push or pull the room between positions. For example, but not by means of limitation, room 10 could be manually pushed or pulled between its extended and retracted position with appropriately placed handles (not shown). A drive mechanism or motor could be attached to linkage shaft 62 to use the motion stabilizer 36 to engage pinion gears 60a, b to shift the room. Another possible drive mechanism could include mounting an extensible and retractable drive cylinder between the main structure 12 and room 10 to shift the room between its extended and retracted position. Another alternative might include using coordinated drive mechanisms to rotate support sheaves 38a, 38b and 40a, 40b in a coordinated manner to shift the room between its extended and retracted positions. In any event, the particular type of actuating mechanism used to shift room 10 between its extended and retracted position are generally independent of the tension support system described herein.

Figure 6:
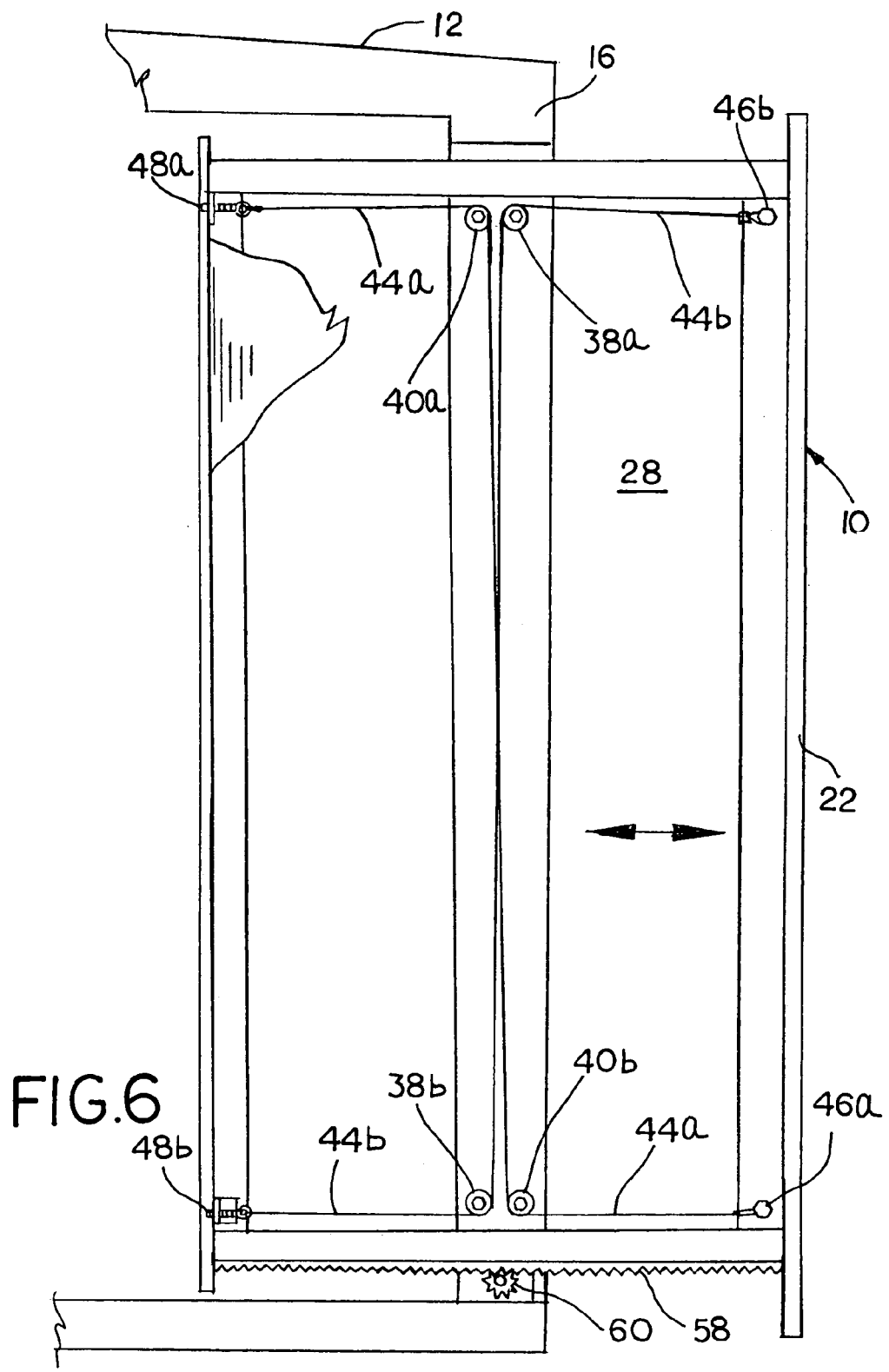
FIG. 6 is a side view of the room shown in an intermediate position with an alternative embodiment of the cable support system.

An alternative embodiment of the tension support system previously described herein is shown in FIG. 6. Parts with the same reference numerals as for the embodiment of FIG. 1 are the same and have the same functions as previously described. Cable 44 used in FIG. 1 is divided in FIG. 6 into two cables 44a, 44b. Cable 44a is trained about support sheaves 40a, 40b between a tensioning anchor 48a attached to sidewall 24, 26 and fixed anchor 46a attached also to the sidewalls. Cable 44b is trained about support sheaves 38a, 38b between a tensioning anchor 48b and fixed anchor 46b, each attached to sidewalls 24, 26. In this embodiment, because there is no room leveler acting on a single cable, the room may be leveled by simultaneously extending one tensioning anchor 48a, or 48b, while retracting the other tensioning anchor. Room 10 will be supported by cables 44a, 44b as the room is moved between its extended and retracted positions in a manner similar to that already described for the embodiment of FIG. 1.

The detailed description hereinbefore related is only meant to exemplify the invention to enable those skilled in the art to make and use it. The subject invention is not to be limited to the details given above for the preferred embodiment, but may be modified within the scope of the impending claims.

I claim:

1. A slide out room carried by a main structure, said room shiftable relative to said main structure between a retracted position and an extended position through an opening in said main structure, said room glidably supported from said main structure by a tensile support system, said tensile support system comprising a first pair of guide members rotatably carried by said main structure, a second pair of guide members rotatably carried by said main structure, a first length of flexible tension member and a second length of flexible tension member, each said length fixedly carried by said room, a longitudinally extensible and retractable adjustment member carried by said room, said lengths connected to form a unified tension member, said unified tension member contacting said adjustment member, said first length trained about said first pair of guide members in one direction and said second length trained about said second pair of guide members in an opposite direction from said first length, one of said lengths supporting said room in its retracted position, said room shiftable between its said retracted and extended positions by the simultaneous shifting of said lengths about said guide members, wherein the angular alignment of said room relative to said main structure may be adjusted by extending or retracting said adjustment member.

2. A slide out room carried by a main structure, said room having an inner end and an outer end, said room shiftable relative to said main structure between a retracted position and an extended position through an opening in said main structure by a cable support system, said support system comprising a first pair of vertically spaced guide members rotatably carried by said main structure, first and second lengths of cable carried by said room, each said length of cable extending from said room inner end to said room outer end, said first length of cable trained about said first pair of guide members in one direction, said second length of cable trained about a second pair of guide members in an opposite direction from said first length of cable, a third pair of vertically offset guide members rotatable carried by said room at one of said inner or outer room ends, said cable trained about said third pair of guide members, said first length of cable is connected to said second length of cable to form a single cable having opposite ends, one of said lengths of cable supporting said room in its extended position, the other of said lengths of cable supporting said room in its retracted position, and a leveler carried by said room, said leveler including an extensible adjustment member, said cable engaging said adjustment member, whereby said room is shiftable between its said retracted and extended positions by the simultaneous shifting of said lengths of cable about said first and second guide members and said room may be leveled by extending said adjustment member.

\* \* \* \* \*